United States Patent
Nakazawa et al.

(10) Patent No.: US 9,464,688 B2
(45) Date of Patent: Oct. 11, 2016

(54) CHAIN FOR CONTINUOUSLY VARIABLE TRANSMISSION

(71) Applicant: JTEKT CORPORATION, Osaka-shi, Osaka (JP)

(72) Inventors: Teruhiko Nakazawa, Nagoya (JP); Ichiro Tarutani, Owariasahi (JP); Yuji Nagasawa, Seto (JP); Shinji Yamane, Kashiba (JP); Keisuke Mori, Yamatokoriyama (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/053,598

(22) Filed: Feb. 25, 2016

(65) Prior Publication Data

US 2016/0178032 A1    Jun. 23, 2016

Related U.S. Application Data

(62) Division of application No. 13/664,167, filed on Oct. 30, 2012, now Pat. No. 9,303,724.

(30) Foreign Application Priority Data

Oct. 31, 2011    (JP) .................................. 2011-239441

(51) Int. Cl.
*F16G 13/06* (2006.01)
*F16H 9/16* (2006.01)

(52) U.S. Cl.
CPC ................. *F16G 13/06* (2013.01); *F16H 9/16* (2013.01)

(58) Field of Classification Search
CPC ............ F16G 13/06; F16G 5/18; F16H 9/24; F16H 9/18; F16H 9/16; F16H 57/006

USPC .......................................................... 474/228
See application file for complete search history.

(56) References Cited

U.S. PATENT DOCUMENTS

| 4,581,001 A | * | 4/1986 | Rattunde | ................... F16H 9/24 474/214 |
| 4,927,404 A | * | 5/1990 | Rattunde | ................... F16H 9/24 474/242 |

(Continued)

FOREIGN PATENT DOCUMENTS

| CN | 1864016 A | 11/2006 |
| CN | 1930406 A | 3/2007 |

(Continued)

OTHER PUBLICATIONS

Jan. 28, 2015 Office Action issued in Chinese Patent Application No. 201210421068.8.

(Continued)

*Primary Examiner* — Michael Riegelman
(74) *Attorney, Agent, or Firm* — Oliff PLC

(57) ABSTRACT

Three links within one width-direction unit are included in respectively different link units. The links in the first row and the sixth row from the right end and the left end of a chain are included in the same link unit. The links in the second row and the fifth row are included in the same link unit. The links in the ninth row and the tenth row are included in the same link unit other than the link unit in which the links in the second row and the fifth row are included. With the above structure, the stress amplitude of the links forming a chain for a chain-type continuously variable transmission can be reduced.

1 Claim, 17 Drawing Sheets

(56) References Cited

U.S. PATENT DOCUMENTS

| | | | |
|---|---|---|---|
| 5,728,021 A | 3/1998 | van Rooij et al. | |
| 6,135,908 A | 10/2000 | Greiter | |
| 6,142,903 A * | 11/2000 | Heinrich | F16G 5/18 474/215 |
| 6,299,559 B1 * | 10/2001 | Friedmann | F16G 5/18 474/213 |
| 6,346,058 B1 * | 2/2002 | Linnenbrugger | F16G 5/18 474/212 |
| 6,478,704 B1 * | 11/2002 | Greiter | F16G 5/18 474/215 |
| 6,558,281 B1 | 5/2003 | Greiter | |
| 6,811,507 B2 * | 11/2004 | Baumann | B21L 15/005 148/206 |
| 6,824,484 B2 | 11/2004 | Greiter | |
| 7,357,742 B2 * | 4/2008 | Wagner | F16G 5/18 474/202 |
| 7,775,030 B2 * | 8/2010 | Yasuhara | B21L 15/00 474/214 |
| 7,874,952 B2 | 1/2011 | Tada et al. | |
| 8,100,794 B2 | 1/2012 | Kamamoto et al. | |
| 8,678,966 B2 | 3/2014 | Kamamoto et al. | |
| 9,353,830 B2 * | 5/2016 | Ichijo | F16G 13/08 |
| 2002/0091027 A1 | 7/2002 | Scheufele et al. | |
| 2003/0036450 A1 | 2/2003 | Linnenbrugger et al. | |
| 2003/0186767 A1 | 10/2003 | Greiter | |
| 2005/0119081 A1 | 6/2005 | Triller et al. | |
| 2007/0042849 A1 | 2/2007 | Tada et al. | |
| 2007/0072722 A1 | 3/2007 | Kamamoto et al. | |
| 2007/0087881 A1 | 4/2007 | Baumann et al. | |
| 2007/0093331 A1 | 4/2007 | Junig et al. | |
| 2007/0178738 A1 | 8/2007 | Yasuhara et al. | |
| 2007/0191166 A1 | 8/2007 | Yasuhara et al. | |
| 2007/0238566 A1 | 10/2007 | Miura | |
| 2008/0015070 A1 | 1/2008 | Miura | |
| 2008/0161148 A1 | 7/2008 | Tada et al. | |
| 2008/0176693 A1 | 7/2008 | Teubert | |
| 2008/0287235 A1 | 11/2008 | Miura | |
| 2010/0035713 A1 | 2/2010 | Miura et al. | |
| 2010/0071191 A1 | 3/2010 | Yasuhara et al. | |
| 2010/0203988 A1 | 8/2010 | Kamamoto et al. | |
| 2010/0279805 A1 | 11/2010 | Kamamoto et al. | |
| 2011/0034278 A1 | 2/2011 | Inoue et al. | |
| 2013/0079183 A1 | 3/2013 | Miura et al. | |
| 2013/0109515 A1 | 5/2013 | Nakazawa et al. | |
| 2013/0109521 A1 | 5/2013 | Nakazawa et al. | |
| 2014/0045633 A1 | 2/2014 | Nakazawa et al. | |
| 2014/0066243 A1 | 3/2014 | Nakazawa et al. | |

FOREIGN PATENT DOCUMENTS

| | | |
|---|---|---|
| CN | 101809315 A | 8/2010 |
| CN | 101809316 A | 8/2010 |
| DE | 19922827 A1 | 11/1999 |
| DE | 102009023815 A1 | 12/2009 |
| JP | 2000-027955 A | 1/2000 |
| JP | 2001-140987 A | 5/2001 |
| JP | 2002-174303 A | 6/2002 |
| JP | 2009-510369 A | 3/2009 |
| JP | 4372551 B2 | 11/2009 |
| JP | 2010-512494 A | 4/2010 |
| JP | 2011-524501 A | 9/2011 |
| JP | 4893561 B2 | 3/2012 |
| WO | 03/052290 A1 | 6/2003 |
| WO | 2005/085673 A1 | 9/2005 |
| WO | 2008/071145 A1 | 6/2008 |

OTHER PUBLICATIONS

Apr. 21, 2015 Office Action issued in Japanese Application No. 2011-239441.

Aug. 19, 2013 Search Report issued in European Patent Application No. 12190514.5.

U.S. Appl. No. 13/664,167, filed Oct. 30, 2012 in the name of Nakazawa et al.

* cited by examiner

988 ARRANGEMENT

| CATEGORY | LINK POSITION (ROW) | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| FIRST PATTERN | 1 | 2 | 3 | 3 | 2 | 1 | | | 1 | 1 | | | |
| | 1 | 2 | 3 | 3 | 2 | 1 | | | 3 | 3 | | | |
| | 1 | 3 | 2 | 2 | 3 | 1 | | | 1 | 1 | | | |
| | 1 | 3 | 2 | 2 | 3 | 1 | | | 2 | 2 | | | |
| SECOND PATTERN | 1 | 2 | 3 | 3 | 2 | 1 | | | 2 | 2 | | | 1 |
| | 1 | 2 | 3 | 3 | 2 | 1 | | | 2 | 2 | | | 3 |
| | 1 | 3 | 2 | 2 | 3 | 1 | | | 3 | 3 | | | 1 |
| | 1 | 3 | 2 | 2 | 3 | 1 | | | 3 | 3 | | | 2 |
| THIRD PATTERN | 1 | 2 | 3 | 3 | 2 | 1 | | | 1 | 2 | | | 2 |
| | 1 | 2 | 3 | 3 | 2 | 1 | | | 1 | 3 | | | 3 |
| | 1 | 2 | 3 | 3 | 2 | 1 | | | 3 | 1 | | | 1 |
| | 1 | 2 | 3 | 3 | 2 | 1 | | | 3 | 2 | | | 2 |
| | 1 | 3 | 2 | 2 | 3 | 1 | | | 1 | 2 | | | 2 |
| | 1 | 3 | 2 | 2 | 3 | 1 | | | 1 | 3 | | | 3 |
| | 1 | 3 | 2 | 2 | 3 | 1 | | | 2 | 1 | | | 1 |
| | 1 | 3 | 2 | 2 | 3 | 1 | | | 2 | 3 | | | 3 |
| FOURTH PATTERN | 1 | 2 | 3 | 3 | 2 | 1 | 3 | 2 | 1 | 2 | | | 3 |
| | 1 | 2 | 3 | 3 | 2 | 1 | 2 | 3 | 1 | 3 | | | 2 |
| | 1 | 2 | 3 | 3 | 2 | 1 | 2 | 1 | 3 | 1 | | | 2 |
| | 1 | 2 | 3 | 3 | 2 | 1 | 1 | 2 | 3 | 2 | | | 1 |
| | 1 | 3 | 2 | 2 | 3 | 1 | 3 | 2 | 1 | 2 | | | 3 |
| | 1 | 3 | 2 | 2 | 3 | 1 | 2 | 3 | 1 | 3 | | | 2 |
| | 1 | 3 | 2 | 2 | 3 | 1 | 3 | 1 | 2 | 1 | | | 3 |
| | 1 | 3 | 2 | 2 | 3 | 1 | 1 | 3 | 2 | 3 | | | 1 |
| FIFTH PATTERN | 1 | 2 | 3 | 2 | 3 | 1 | 3 | | | 3 | | | 2 |
| | 1 | 3 | 2 | 3 | 2 | 1 | 2 | | | 2 | | | 3 |
| SIXTH PATTERN | 1 | 2 | 3 | 3 | 1 | 2 | 2 | 3 | 1 | 2 | | | 3 |
| | 1 | 3 | 2 | 2 | 1 | 3 | 3 | 2 | 1 | 3 | | | 2 |

●ARBITRARY POSSIBLE LINK UNIT NUMBER CAN BE PLACED IN BLANK CELL

FIG. 6

| RANK | LINK POSITION (ROW) | | | | | | | | | | | | | MAXIMUM STRESS NORMALIZED VALUE | PATTERN |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | | |
| 1 | 1 | 2 | 3 | 3 | 2 | 1 | 2 | 1 | 3 | 3 | 2 | 1 | 2 | 0.951 | 1 |
| 2 | 1 | 3 | 2 | 2 | 3 | 1 | 3 | 1 | 2 | 2 | 3 | 1 | 3 | 0.952 | 1 |
| 3 | 1 | 3 | 2 | 2 | 3 | 1 | 3 | 2 | 1 | 1 | 3 | 2 | 3 | 0.952 | 1 |
| 4 | 1 | 2 | 3 | 3 | 2 | 1 | 2 | 3 | 1 | 1 | 2 | 3 | 2 | 0.952 | 1 |
| 5 | 1 | 2 | 3 | 3 | 2 | 1 | 2 | 3 | 1 | 1 | 3 | 2 | 3 | 0.955 | 1 |
| 6 | 1 | 3 | 2 | 2 | 3 | 1 | 3 | 2 | 1 | 1 | 2 | 3 | 2 | 0.956 | 1 |
| 7 | 1 | 2 | 3 | 3 | 2 | 1 | 2 | 1 | 3 | 3 | 1 | 2 | 2 | 0.958 | 1 |
| 8 | 1 | 3 | 2 | 2 | 3 | 1 | 3 | 1 | 2 | 2 | 1 | 3 | 3 | 0.958 | 1 |
| 9 | 1 | 2 | 3 | 3 | 2 | 1 | 2 | 3 | 1 | 1 | 3 | 2 | 2 | 0.958 | 1 |
| 10 | 1 | 3 | 2 | 2 | 3 | 1 | 3 | 2 | 1 | 1 | 2 | 3 | 3 | 0.959 | 1 |
| 11 | 1 | 3 | 2 | 2 | 3 | 1 | 2 | 3 | 1 | 1 | 3 | 2 | 2 | 0.962 | 1 |
| 12 | 1 | 2 | 3 | 3 | 2 | 1 | 3 | 2 | 1 | 1 | 2 | 3 | 3 | 0.964 | 1 |
| 13 | 1 | 3 | 2 | 2 | 3 | 1 | 3 | 2 | 1 | 1 | 3 | 2 | 2 | 0.969 | 1 |
| 14 | 1 | 2 | 3 | 3 | 2 | 1 | 2 | 3 | 1 | 1 | 2 | 3 | 3 | 0.969 | 1 |
| 15 | 1 | 3 | 2 | 2 | 3 | 1 | 2 | 3 | 1 | 1 | 2 | 3 | 2 | 0.970 | 1 |
| 16 | 1 | 3 | 2 | 2 | 3 | 1 | 1 | 3 | 2 | 2 | 3 | 1 | 1 | 0.970 | 1 |
| 17 | 1 | 2 | 3 | 3 | 2 | 1 | 3 | 2 | 1 | 3 | 1 | 2 | 3 | 0.970 | 3 |
| 18 | 1 | 2 | 3 | 3 | 2 | 1 | 1 | 2 | 3 | 3 | 2 | 1 | 1 | 0.971 | 1 |
| 19 | 1 | 3 | 2 | 2 | 3 | 1 | 2 | 3 | 1 | 2 | 1 | 3 | 2 | 0.971 | 3 |
| 20 | 1 | 2 | 3 | 3 | 2 | 1 | 3 | 2 | 1 | 1 | 3 | 2 | 3 | 0.971 | 1 |
| 21 | 1 | 3 | 2 | 2 | 3 | 1 | 3 | 2 | 1 | 3 | 1 | 2 | 3 | 0.975 | 3 |
| 22 | 1 | 2 | 3 | 3 | 2 | 1 | 2 | 1 | 3 | 2 | 3 | 1 | 2 | 0.975 | 2 |
| 23 | 1 | 2 | 3 | 3 | 2 | 1 | 2 | 3 | 1 | 2 | 1 | 3 | 2 | 0.975 | 3 |
| 24 | 1 | 3 | 2 | 2 | 3 | 1 | 3 | 1 | 2 | 3 | 2 | 1 | 3 | 0.975 | 3 |
| 25 | 1 | 2 | 3 | 3 | 2 | 1 | 2 | 1 | 3 | 3 | 1 | 2 | 1 | 0.976 | 1 |
| 26 | 1 | 3 | 2 | 2 | 3 | 1 | 3 | 1 | 2 | 2 | 1 | 3 | 1 | 0.977 | 1 |
| 27 | 1 | 2 | 3 | 3 | 2 | 1 | 2 | 3 | 1 | 3 | 1 | 2 | 3 | 0.977 | 3 |
| 28 | 1 | 3 | 2 | 2 | 3 | 1 | 3 | 2 | 1 | 2 | 1 | 3 | 2 | 0.978 | 3 |
| 29 | 1 | 3 | 2 | 2 | 3 | 1 | 1 | 3 | 2 | 2 | 1 | 3 | 1 | 0.979 | 1 |
| 30 | 1 | 2 | 3 | 3 | 2 | 1 | 1 | 2 | 3 | 3 | 2 | 1 | 3 | 0.980 | 1 |
| 31 | 1 | 3 | 2 | 2 | 3 | 1 | 1 | 3 | 2 | 2 | 3 | 1 | 2 | 0.980 | 1 |
| 32 | 1 | 2 | 3 | 3 | 2 | 1 | 1 | 2 | 3 | 3 | 1 | 2 | 3 | 0.980 | 1 |
| 33 | 1 | 2 | 3 | 3 | 2 | 1 | 1 | 2 | 3 | 3 | 1 | 2 | 1 | 0.980 | 1 |
| 34 | 1 | 2 | 3 | 3 | 2 | 1 | 1 | 2 | 3 | 2 | 3 | 1 | 2 | 0.981 | 2 |
| 35 | 1 | 3 | 2 | 2 | 3 | 1 | 1 | 3 | 2 | 1 | 2 | 3 | 1 | 0.981 | 3 |
| 36 | 1 | 3 | 2 | 2 | 3 | 1 | 1 | 3 | 2 | 2 | 1 | 3 | 2 | 0.981 | 1 |
| 37 | 1 | 2 | 3 | 3 | 2 | 1 | 1 | 2 | 3 | 1 | 3 | 2 | 1 | 0.981 | 3 |
| 38 | 1 | 3 | 2 | 2 | 3 | 1 | 1 | 3 | 2 | 3 | 2 | 1 | 3 | 0.981 | 3 |
| 39 | 1 | 3 | 2 | 2 | 3 | 1 | 3 | 1 | 2 | 2 | 1 | 3 | 2 | 0.982 | 1 |
| 40 | 1 | 2 | 3 | 3 | 2 | 1 | 2 | 1 | 3 | 3 | 1 | 2 | 3 | 0.982 | 1 |

FIG. 12

| RANK | LINK POSITION (ROW) | | | | | | | | | | | | | MAXIMUM STRESS NORMALIZED VALUE | PATTERN |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | | |
| 41 | 1 | 3 | 2 | 2 | 3 | 1 | 3 | 1 | 2 | 2 | 3 | 1 | 2 | 0.982 | 1 |
| 42 | 1 | 2 | 3 | 3 | 2 | 1 | 2 | 1 | 3 | 3 | 2 | 1 | 3 | 0.983 | 1 |
| 43 | 1 | 3 | 2 | 2 | 3 | 1 | 2 | 1 | 3 | 3 | 2 | 1 | 2 | 0.984 | 2 |
| 44 | 1 | 2 | 3 | 3 | 2 | 1 | 3 | 1 | 2 | 2 | 3 | 1 | 3 | 0.985 | 2 |
| 45 | 1 | 2 | 3 | 3 | 2 | 1 | 3 | 2 | 1 | 3 | 2 | 1 | 3 | 0.985 | 3 |
| 46 | 1 | 3 | 2 | 2 | 3 | 1 | 2 | 3 | 1 | 3 | 1 | 2 | 3 | 0.986 | 3 |
| 47 | 1 | 3 | 2 | 2 | 3 | 1 | 2 | 3 | 1 | 2 | 3 | 1 | 2 | 0.986 | 3 |
| 48 | 1 | 2 | 3 | 3 | 2 | 1 | 3 | 2 | 1 | 2 | 1 | 3 | 2 | 0.986 | 3 |
| 49 | 1 | 2 | 3 | 3 | 2 | 1 | 2 | 1 | 3 | 3 | 2 | 1 | 1 | 0.988 | 1 |
| 50 | 1 | 3 | 2 | 2 | 3 | 1 | 3 | 1 | 2 | 1 | 2 | 3 | 1 | 0.988 | 3 |
| 51 | 1 | 3 | 2 | 2 | 3 | 1 | 1 | 2 | 3 | 3 | 2 | 1 | 2 | 0.989 | 2 |
| 52 | 1 | 3 | 2 | 2 | 3 | 1 | 3 | 1 | 2 | 2 | 3 | 1 | 1 | 0.989 | 1 |
| 53 | 1 | 2 | 3 | 3 | 2 | 1 | 2 | 1 | 3 | 1 | 3 | 2 | 1 | 0.989 | 3 |
| 54 | 1 | 2 | 3 | 3 | 2 | 1 | 3 | 2 | 1 | 2 | 1 | 3 | 3 | 0.990 | 4 |
| 55 | 1 | 3 | 2 | 2 | 3 | 1 | 3 | 2 | 1 | 3 | 2 | 1 | 3 | 0.990 | 3 |
| 56 | 1 | 3 | 2 | 2 | 3 | 1 | 2 | 3 | 1 | 3 | 1 | 2 | 2 | 0.990 | 4 |
| 57 | 1 | 2 | 3 | 3 | 2 | 1 | 2 | 3 | 1 | 2 | 3 | 1 | 2 | 0.990 | 3 |
| 58 | 1 | 2 | 3 | 3 | 2 | 1 | 1 | 3 | 2 | 2 | 3 | 1 | 3 | 0.990 | 2 |
| 59 | 1 | 3 | 2 | 2 | 3 | 1 | 2 | 1 | 3 | 3 | 1 | 2 | 2 | 0.991 | 2 |
| 60 | 1 | 2 | 3 | 3 | 2 | 1 | 2 | 1 | 3 | 1 | 3 | 2 | 2 | 0.992 | 4 |
| 61 | 1 | 3 | 2 | 2 | 3 | 1 | 3 | 1 | 2 | 1 | 2 | 3 | 3 | 0.992 | 4 |
| 62 | 1 | 2 | 3 | 3 | 2 | 1 | 3 | 1 | 2 | 2 | 1 | 3 | 3 | 0.993 | 2 |
| 63 | 1 | 2 | 3 | 3 | 2 | 1 | 2 | 1 | 3 | 2 | 1 | 3 | 2 | 0.993 | 2 |
| 64 | 1 | 2 | 3 | 3 | 2 | 1 | 2 | 3 | 1 | 3 | 2 | 1 | 3 | 0.993 | 3 |
| 65 | 1 | 3 | 2 | 2 | 3 | 1 | 3 | 2 | 1 | 2 | 3 | 1 | 3 | 0.993 | 3 |
| 66 | 1 | 2 | 3 | 3 | 2 | 1 | 2 | 3 | 1 | 3 | 1 | 2 | 2 | 0.994 | 4 |
| 67 | 1 | 3 | 2 | 2 | 1 | 3 | 3 | 2 | 1 | 3 | 2 | 1 | 2 | 0.994 | 6 |
| 68 | 1 | 3 | 2 | 2 | 3 | 1 | 3 | 2 | 1 | 2 | 3 | 1 | 2 | 0.994 | 3 |
| 69 | 1 | 3 | 2 | 2 | 3 | 1 | 3 | 2 | 1 | 2 | 1 | 3 | 3 | 0.994 | 4 |
| 70 | 1 | 3 | 2 | 2 | 3 | 1 | 1 | 2 | 3 | 3 | 1 | 2 | 1 | 0.994 | 2 |
| 71 | 1 | 2 | 3 | 2 | 3 | 1 | 3 | 2 | 1 | 3 | 1 | 2 | 2 | 0.995 | 5 |
| 72 | 1 | 2 | 3 | 3 | 2 | 1 | 1 | 3 | 2 | 2 | 1 | 3 | 1 | 0.995 | 2 |
| 73 | 1 | 3 | 2 | 3 | 2 | 1 | 2 | 3 | 1 | 2 | 1 | 3 | 3 | 0.995 | 5 |
| 74 | 1 | 2 | 3 | 2 | 3 | 1 | 3 | 2 | 1 | 3 | 2 | 1 | 2 | 0.997 | 5 |
| 75 | 1 | 2 | 3 | 3 | 1 | 2 | 2 | 3 | 1 | 2 | 3 | 1 | 3 | 0.997 | 6 |
| 76 | 1 | 3 | 2 | 2 | 3 | 1 | 1 | 2 | 3 | 3 | 1 | 2 | 2 | 0.997 | 2 |
| 77 | 1 | 3 | 2 | 2 | 3 | 1 | 1 | 3 | 2 | 3 | 2 | 1 | 1 | 0.997 | 4 |
| 78 | 1 | 2 | 3 | 2 | 3 | 1 | 3 | 1 | 2 | 3 | 2 | 1 | 2 | 0.997 | 5 |
| 79 | 1 | 3 | 2 | 2 | 3 | 2 | 1 | 2 | 3 | 3 | 2 | 1 | 3 | 0.997 | 5 |
| 80 | 1 | 2 | 3 | 3 | 2 | 1 | 1 | 2 | 3 | 2 | 3 | 1 | 1 | 0.997 | 4 |

FIG. 13

| RANK | LINK POSITION (ROW) | | | | | | | | | | | | | MAXIMUM STRESS NORMALIZED VALUE | PATTERN |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | | |
| 81 | 1 | 2 | 3 | 3 | 2 | 1 | 3 | 2 | 1 | 2 | 3 | 1 | 3 | 0.998 | 4 |
| 82 | 1 | 3 | 2 | 2 | 3 | 1 | 2 | 3 | 1 | 3 | 2 | 1 | 2 | 0.998 | 4 |
| 83 | 1 | 3 | 2 | 2 | 3 | 1 | 1 | 3 | 2 | 1 | 3 | 2 | 1 | 0.998 | 3 |
| 84 | 1 | 2 | 3 | 3 | 2 | 1 | 1 | 3 | 2 | 2 | 1 | 3 | 3 | 0.999 | 2 |
| 85 | 1 | 2 | 3 | 3 | 2 | 1 | 1 | 2 | 3 | 1 | 2 | 3 | 1 | 0.999 | 3 |
| 86 | 1 | 2 | 3 | 3 | 2 | 1 | 1 | 2 | 3 | 2 | 1 | 3 | 2 | 0.999 | 2 |
| 87 | 1 | 3 | 2 | 3 | 2 | 1 | 2 | 3 | 1 | 2 | 3 | 1 | 3 | 0.999 | 5 |
| 88 | 1 | 3 | 2 | 2 | 3 | 1 | 1 | 2 | 3 | 3 | 2 | 1 | 1 | 1.000 | 2 |
| 89 | 1 | 3 | 2 | 2 | 3 | 1 | 1 | 3 | 2 | 3 | 1 | 2 | 3 | 1.000 | 3 |
| 90 | 1 | 3 | 2 | 2 | 1 | 3 | 3 | 2 | 1 | 3 | 1 | 2 | 2 | 1.000 | 6 |
| 92 | 1 | 2 | 3 | 3 | 2 | 1 | 1 | 3 | 2 | 2 | 3 | 1 | 1 | 1.001 | 2 |
| 96 | 1 | 3 | 2 | 2 | 3 | 1 | 2 | 3 | 1 | 3 | 2 | 1 | 3 | 1.002 | 3 |
| 97 | 1 | 2 | 3 | 3 | 2 | 1 | 2 | 3 | 1 | 3 | 2 | 1 | 2 | 1.002 | 4 |
| 98 | 1 | 2 | 3 | 3 | 2 | 1 | 3 | 2 | 1 | 2 | 3 | 1 | 2 | 1.002 | 3 |
| 99 | 1 | 3 | 2 | 2 | 3 | 1 | 3 | 2 | 1 | 2 | 3 | 1 | 3 | 1.003 | 4 |
| 100 | 1 | 2 | 3 | 3 | 1 | 2 | 2 | 3 | 1 | 2 | 1 | 3 | 3 | 1.003 | 6 |
| 101 | 1 | 2 | 3 | 3 | 2 | 1 | 2 | 1 | 3 | 1 | 2 | 3 | 2 | 1.003 | 4 |
| 102 | 1 | 3 | 2 | 2 | 3 | 1 | 3 | 1 | 2 | 1 | 3 | 2 | 3 | 1.004 | 4 |
| 104 | 1 | 3 | 2 | 2 | 3 | 1 | 1 | 3 | 2 | 2 | 3 | 1 | 3 | 1.005 | 1 |
| 106 | 1 | 3 | 2 | 3 | 2 | 1 | 2 | 1 | 3 | 2 | 1 | 3 | 3 | 1.005 | 5 |
| 107 | 1 | 2 | 3 | 2 | 3 | 1 | 3 | 1 | 2 | 3 | 1 | 2 | 2 | 1.005 | 5 |
| 108 | 1 | 2 | 3 | 3 | 2 | 1 | 1 | 2 | 3 | 3 | 2 | 1 | 2 | 1.006 | 1 |
| 111 | 1 | 3 | 2 | 2 | 3 | 1 | 3 | 1 | 2 | 1 | 3 | 2 | 1 | 1.007 | 3 |
| 112 | 1 | 2 | 3 | 3 | 2 | 1 | 2 | 3 | 1 | 1 | 3 | 2 | 1 | 1.007 | 1 |
| 113 | 1 | 3 | 2 | 2 | 3 | 1 | 2 | 1 | 3 | 3 | 1 | 2 | 1 | 1.007 | 2 |
| 115 | 1 | 2 | 3 | 3 | 2 | 1 | 2 | 1 | 3 | 1 | 2 | 3 | 1 | 1.008 | 3 |
| 117 | 1 | 3 | 2 | 2 | 3 | 1 | 3 | 2 | 1 | 1 | 2 | 3 | 1 | 1.008 | 1 |
| 119 | 1 | 2 | 3 | 3 | 2 | 1 | 3 | 1 | 2 | 2 | 1 | 3 | 1 | 1.008 | 2 |
| 121 | 1 | 2 | 3 | 3 | 2 | 1 | 2 | 3 | 1 | 1 | 2 | 3 | 1 | 1.009 | 1 |

FIG. 14

| RANK | LINK POSITION (ROW) | | | | | | | | | | | | | MAXIMUM STRESS NORMALIZED VALUE | PATTERN |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | | |
| 122 | 1 | 3 | 2 | 2 | 3 | 1 | 3 | 2 | 1 | 1 | 3 | 2 | 1 | 1.009 | 1 |
| 124 | 1 | 3 | 2 | 2 | 3 | 1 | 1 | 3 | 2 | 3 | 1 | 2 | 1 | 1.010 | 4 |
| 126 | 1 | 2 | 3 | 3 | 2 | 1 | 1 | 2 | 3 | 2 | 1 | 3 | 1 | 1.010 | 4 |
| 130 | 1 | 2 | 3 | 3 | 2 | 1 | 3 | 2 | 1 | 1 | 2 | 3 | 1 | 1.010 | 1 |
| 131 | 1 | 3 | 2 | 2 | 3 | 1 | 2 | 3 | 1 | 1 | 3 | 2 | 1 | 1.011 | 1 |
| 132 | 1 | 2 | 3 | 3 | 2 | 1 | 3 | 2 | 1 | 1 | 3 | 2 | 1 | 1.011 | 1 |
| 134 | 1 | 3 | 2 | 2 | 3 | 1 | 2 | 3 | 1 | 1 | 2 | 3 | 1 | 1.012 | 1 |
| 135 | 1 | 3 | 2 | 2 | 3 | 1 | 2 | 3 | 1 | 1 | 3 | 2 | 3 | 1.012 | 1 |
| 139 | 1 | 2 | 3 | 3 | 2 | 1 | 3 | 2 | 1 | 1 | 2 | 3 | 2 | 1.013 | 1 |
| 142 | 1 | 3 | 2 | 2 | 3 | 1 | 2 | 1 | 3 | 3 | 2 | 1 | 1 | 1.014 | 2 |
| 147 | 1 | 2 | 3 | 3 | 2 | 1 | 3 | 1 | 2 | 2 | 3 | 1 | 1 | 1.015 | 2 |
| 161 | 1 | 3 | 2 | 2 | 3 | 1 | 1 | 3 | 2 | 2 | 1 | 3 | 3 | 1.019 | 1 |
| 165 | 1 | 2 | 3 | 3 | 2 | 1 | 1 | 2 | 3 | 3 | 1 | 2 | 2 | 1.020 | 1 |
| 193 | 1 | 3 | 2 | 2 | 3 | 1 | 2 | 3 | 1 | 1 | 2 | 3 | 3 | 1.026 | 1 |
| 195 | 1 | 2 | 3 | 3 | 2 | 1 | 3 | 2 | 1 | 1 | 3 | 2 | 2 | 1.027 | 1 |

FIG. 15

888 ARRANGEMENTS

| CATEGORY | LINK POSITION (ROW) | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| SEVENTH PATTERN | 1 | 2 | 3 | 3 | 2 | 1 | | | 1 | 1 | | |
| | 1 | 2 | 3 | 3 | 2 | 1 | | | 3 | 3 | | |
| | 1 | 3 | 2 | 2 | 3 | 1 | | | 1 | 1 | | |
| | 1 | 3 | 2 | 2 | 3 | 1 | | | 2 | 2 | | |
| EIGHTH PATTERN | 1 | 2 | 3 | 3 | 2 | 1 | | | 3 | 1 | | 2 |
| | 1 | 2 | 3 | 3 | 2 | 1 | | | 3 | 2 | | 1 |
| | 1 | 3 | 2 | 2 | 3 | 1 | | | 2 | 1 | | 3 |
| | 1 | 3 | 2 | 2 | 3 | 1 | | | 2 | 3 | | 1 |

●ARBITRARY POSSIBLE LINK UNIT NUMBER CAN BE PLACED IN BLANK CELL

FIG. 16

| RANK | LINK POSITION (ROW) | | | | | | | | | | | | MAXIMUM STRESS NORMALIZED VALUE | PATTERN |
|---|---|---|---|---|---|---|---|---|---|---|---|---|---|---|
| | 1 | 2 | 3 | 4 | 5 | 6 | 7 | 8 | 9 | 10 | 11 | 12 | | |
| 1 | 1 | 3 | 2 | 2 | 3 | 1 | 3 | 1 | 2 | 2 | 1 | 3 | 0.9699 | 1 |
| 2 | 1 | 3 | 2 | 2 | 3 | 1 | 3 | 1 | 2 | 2 | 3 | 1 | 0.97011 | 1 |
| 3 | 1 | 2 | 3 | 3 | 2 | 1 | 2 | 1 | 3 | 3 | 1 | 2 | 0.97012 | 1 |
| 4 | 1 | 2 | 3 | 3 | 2 | 1 | 2 | 1 | 3 | 3 | 2 | 1 | 0.97032 | 1 |
| 5 | 1 | 2 | 3 | 3 | 2 | 1 | 2 | 3 | 1 | 1 | 3 | 2 | 0.97619 | 1 |
| 6 | 1 | 3 | 2 | 2 | 3 | 1 | 3 | 2 | 1 | 1 | 2 | 3 | 0.97675 | 1 |
| 7 | 1 | 2 | 3 | 3 | 2 | 1 | 2 | 3 | 1 | 1 | 2 | 3 | 0.977 | 1 |
| 8 | 1 | 3 | 2 | 2 | 3 | 1 | 3 | 2 | 1 | 1 | 3 | 2 | 0.97737 | 1 |
| 9 | 1 | 3 | 2 | 2 | 3 | 1 | 1 | 3 | 2 | 2 | 3 | 1 | 0.97828 | 1 |
| 10 | 1 | 2 | 3 | 3 | 2 | 1 | 1 | 2 | 3 | 3 | 2 | 1 | 0.9796 | 1 |
| 11 | 1 | 3 | 2 | 2 | 3 | 1 | 2 | 3 | 1 | 1 | 3 | 2 | 0.98479 | 1 |
| 12 | 1 | 2 | 3 | 3 | 2 | 1 | 3 | 2 | 1 | 1 | 2 | 3 | 0.9859 | 1 |
| 13 | 1 | 3 | 2 | 2 | 3 | 1 | 1 | 3 | 2 | 2 | 1 | 3 | 0.98844 | 1 |
| 14 | 1 | 2 | 3 | 3 | 2 | 1 | 1 | 2 | 3 | 3 | 1 | 2 | 0.98965 | 1 |
| 15 | 1 | 3 | 2 | 2 | 3 | 1 | 2 | 3 | 1 | 1 | 2 | 3 | 0.99446 | 1 |
| 16 | 1 | 2 | 3 | 3 | 2 | 1 | 3 | 2 | 1 | 1 | 3 | 2 | 0.9956 | 1 |
| 17 | 1 | 2 | 3 | 3 | 2 | 1 | 1 | 2 | 3 | 2 | 3 | 1 | 0.99617 | 2 |
| 18 | 1 | 3 | 2 | 2 | 3 | 1 | 1 | 3 | 2 | 3 | 2 | 1 | 0.9965 | 2 |
| 19 | 1 | 3 | 2 | 2 | 3 | 1 | 3 | 1 | 2 | 1 | 2 | 3 | 0.9975 | 2 |
| 20 | 1 | 2 | 3 | 3 | 2 | 1 | 2 | 1 | 3 | 1 | 3 | 2 | 0.99776 | 2 |
| 21 | 1 | 2 | 3 | 3 | 2 | 1 | 1 | 2 | 3 | 1 | 3 | 2 | 0.99816 | 2 |
| 22 | 1 | 3 | 2 | 2 | 3 | 1 | 1 | 3 | 2 | 1 | 2 | 3 | 0.99857 | 2 |
| 23 | 1 | 3 | 2 | 2 | 3 | 1 | 3 | 1 | 2 | 3 | 2 | 1 | 1.00077 | 2 |
| 24 | 1 | 2 | 3 | 3 | 2 | 1 | 2 | 1 | 3 | 2 | 3 | 1 | 1.00112 | 2 |

CHAIN FOR CONTINUOUSLY VARIABLE TRANSMISSION

PRIORITY INFORMATION

This is a Division of U.S. patent application Ser. No. 13/664,167 filed on Oct. 30, 2012, which claims the benefit of Japanese Patent Application No. 2011-239441 filed on Oct. 31, 2011. The disclosure, including the specification, claims, drawings, and abstract of the prior applications is hereby incorporated by reference herein in its entirety.

BACKGROUND

1. Technical Field

The present invention relates to a chain for a chain-type continuously variable transmission (CVT), and more particularly to a structure of the chain.

2. Background Art

Continuously variable transmissions (CVTs) including two pulleys each having opposing conical surfaces, the distance therebetween being variable, and a flexible endless member which is wrapped around the two pulleys, are known. The rotation of one pulley is transmitted to the other pulley through the flexible endless member. At this time, varying the distance between the conical surfaces varies the wrapping radius of the flexible endless member with respect to the pulley, thereby allowing the transmission ratio to vary. Japanese Patent No. 4,372,551 (hereinafter referred to as Patent Document 1) discloses, in the specification, a chain for use as a flexible endless member of a continuously variable transmission.

The chain disclosed in Patent Document 1 is formed by coupling a plurality of chain elements. Each chain element includes a link unit and two pins. The link unit is formed by arranging a plurality of plate-shape links in the width direction of the chain, each link having an opening and placed to extend in the circumferential direction of the chain. The pins extend through the opening of the respective links at both ends of the link and come into contact with the conical surfaces at the respective ends of the pin. The interconnection between the chain elements is achieved by allowing the pin of one of adjoining chain elements to pass through the opening of the link of the other chain element.

Patent Document 1 suggests arrangement patterns of the links that can make as uniform as possible a force generated at the coupling section of the chain.

SUMMARY

Technical Problems

Durability of the chain for chain-type CVTs is dependent on the amplitude of a stress generated in the links. It is therefore desired to make the stress amplitude of the links small at a position where such an amplitude is maximum. The arrangement patterns of the links described in Patent Document 1 do not necessarily make the maximum stress amplitude small.

The present invention is aimed at providing an arrangement pattern of links that can reduce the amplitude of a stress generated in the links of a chain of a chain-type CVT.

Means for Solving the Problems

The chain for a continuously variable transmission (CVT) according to the present invention is wrapped around two pulleys having opposing conical surfaces, the distance therebetween being variable, and is formed by coupling chain elements arranged serially in the circumferential direction. The chain element includes a link unit in which a plurality of plate-shape links, each having an opening and placed to extend in the circumferential direction of the chain, are arranged in the width direction of the chain, and two pins extending through the opening of the respective links at both ends of the link. Both ends of at least one of the two pins come into contact with the conical surfaces of the pulley. The interconnection of the chain elements that are adjacent to each other in the circumferential direction of the chain is achieved by allowing the pin of one chain element to pass through the opening of the link of the other chain element.

In the chain according to the present invention, every three consecutive chain elements form one element module. The arrangement pattern of the links is the same for each element module. In other words, the same arrangement pattern of the links appears once every three link units in the circumferential direction.

The numbers of links of the three link units forming each element module are 9, 8, and 8, respectively, or all the three link units include eight links. Further, in the element module, every three links from the right end and the left end of the chain form a width-direction unit. Here, the three links in one width-direction unit are included in respectively different link units. Further, the arrangement pattern is symmetrical in the left-right direction in the width direction of the chain, and only the arrangement pattern on the one-half side will be described below. Also, the position (row) of the link in the width direction will be referred to as the n-th row from one end (n is a natural number).

Concerning the arrangement pattern of links of the element module having 9, 8, and 8 links described above, the following arrangement patterns of links (1) to (6) can be proposed. Further, concerning the link arrangement pattern of the element module having 8, 8, and 8 links, the following arrangement patterns of links (7) and (8) can be proposed.

(1) The links in the first row and the sixth row are included in the same link unit; the links in the second row and the fifth row are included in the same link unit; and the links in the ninth row and the tenth row are included in the same link unit other than the link unit in which the links in the second and the fifth row are included.

(2) The links in the first row and the sixth row are included in the same link unit; the links in the second row, the fifth row, the ninth row, and the tenth row are included in the same link unit; and the link in the thirteenth row is included in a link unit other than the link unit in which the links in the second row, the fifth row, the ninth row, and the tenth row are included.

(3) The links in the first row and the sixth row are included in the same link unit; the links in the second row and the fifth row are included in the same link unit; the link in the ninth row is included in a link unit other than the link unit in which the links in the second and the fifth rows are included; and the links in the tenth row and the thirteenth row are included in a link unit other than the link unit in which the link in the ninth row is included.

(4) The links in the first row and the sixth row are included in the same link unit; the links in the second row and the fifth row are included in the same link unit; the link in the ninth row is included in a link unit other than the link unit in which the links in the second and the fifth rows are included; the links in the ninth row, the tenth row, and the thirteenth row are included in different link units; and the links in the seventh row and the thirteenth row are included in the same link unit.

(5) The links in the first row and the sixth row are included in the same link unit; the links in the second row, the fourth row, and the thirteenth row are included in the same link unit; and the links in the third row, the fifth row, the seventh row, and the tenth row are included in the same link unit.

(6) The links in the first row, the fifth row, and the ninth row are included in the same link unit; the links in the second row, the sixth row, the seventh row, and the tenth row are included in the same link unit; and the links in the third row, the fourth row, and the thirteenth row are included in the same link unit.

(7) The links in the first row and the sixth row are included in the same link unit; the links in the second row and the fifth row are included in the same link unit; and the links in the ninth row and the tenth row are included in the same link unit other than the link unit in which the links in the second and the fifth row are included.

(8) The links in the first row and the sixth row are included in the same link unit; the links in the second row and the fifth row are included in the same link unit; the links in the third row, the fourth row, and the ninth row are included in the same link unit; and the links in the ninth row, the tenth row, and the twelfth row are included in different link units.

Advantageous Effects

With the above arrangements, it is possible to make the amplitude of a stress generated in the links small.

BRIEF DESCRIPTION OF THE DRAWINGS

Preferred embodiments of the present invention will be described in detail based on the following figures, wherein:

FIG. 6 is a view illustrating arrangement patterns of links according to a present embodiment;

FIG. 12 is a view indicating top 40 of all the arrangement patterns according to the present embodiment;

FIG. 13 is a view indicating the 41st place to the 80th place of all the arrangement patterns according to the present embodiment;

FIG. 14 is a view indicating the 81st place to the 121st place of all the arrangement patterns according to the present embodiment;

FIG. 15 is a view indicating the 122nd place to the 195th place of all the arrangement patterns according to the present embodiment;

FIG. 16 is a view illustrating arrangement patterns of links according to another embodiment;

FIG. 22 is a view indicating all the arrangement patterns according to the other embodiment.

DESCRIPTION OF EMBODIMENTS

Figure 1:
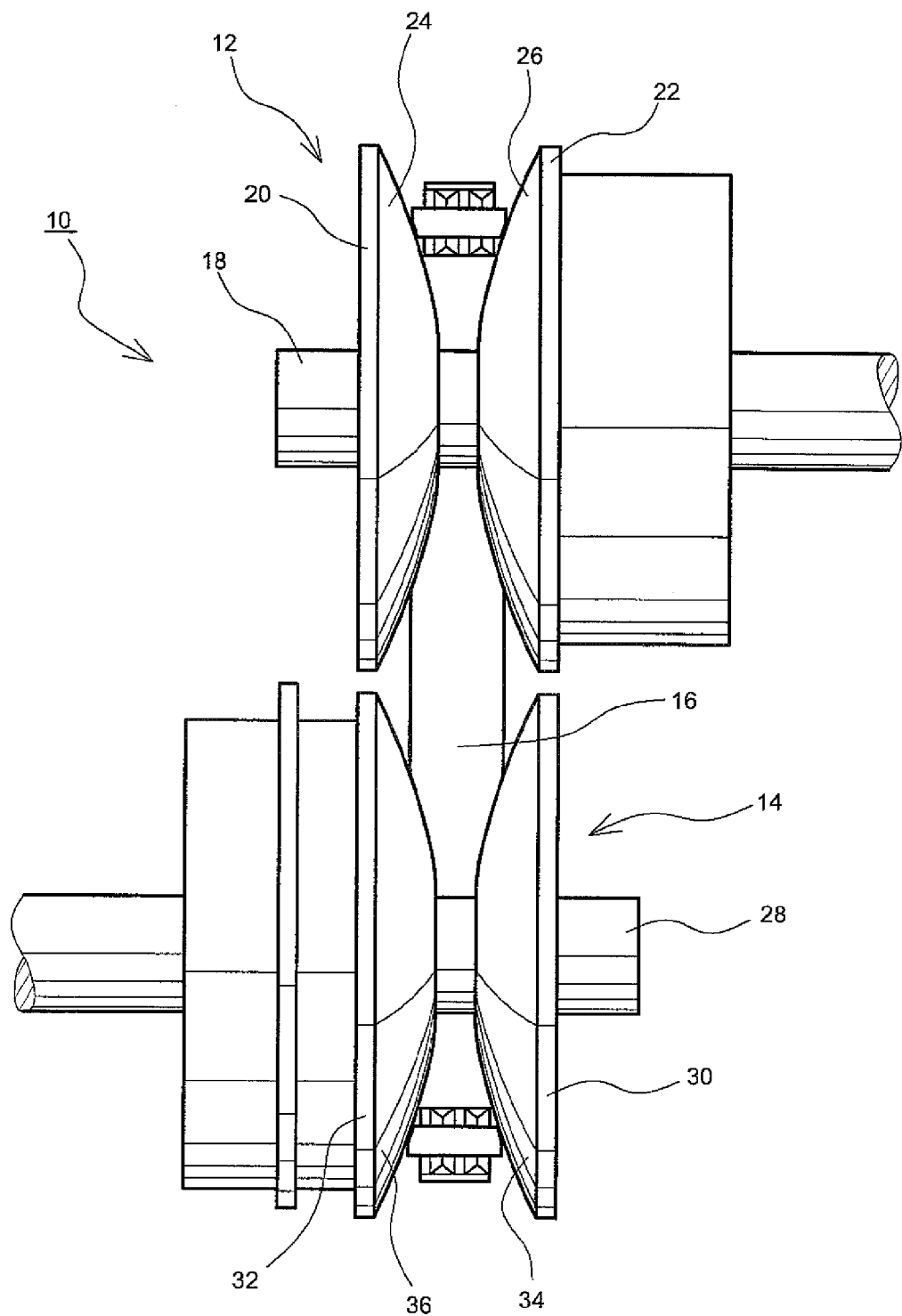
FIG. 1 is a view illustrating a principal portion of a chain-type continuously variable transmission.

Preferred embodiments of the present invention will be described in detail with reference to the accompanying drawings. FIG. 1 illustrates a principal portion of a chain-type continuously variable transmission (CVT) 10. The chain-type CVT 10 includes two pulleys 12 and 14, and a chain 16 which is wrapped around these pulleys. One of the two pulleys will be referred to as an input pulley 12 and the other will be referred to as an output pulley 14. The input pulley 12 includes a fixed sheave 20 which is fixed to an input shaft 18, and a movable sheave 22 which is movable on the input shaft 18 by sliding along the input shaft 18. A surface of the fixed sheave 20 and a surface of the movable sheave 22 that are opposite each other have a shape of a substantially lateral surface of a cone. As illustrated, these substantially cone lateral surfaces are surfaces formed so as to expand with respect to the lateral surface of a cone. These surfaces will be referred to as substantially conical surfaces 24 and 26. These substantially conical surfaces 24 and 26 together form a V-shaped groove, in which the chain 16 is disposed such that side surfaces of the chain 16 are clamped between the substantially conical surfaces 24 and 26. Similar to the input pulley 12, the output pulley 14 includes a fixed sheave 30 which is fixed to an output shaft 28, and a movable sheave 32 which is movable on the output shaft 28 by sliding along the output shaft 28. A surface of the fixed sheave 30 and a surface of the movable sheave 32 that are opposite each other have a shape of a substantially lateral surface of a cone. As illustrated, these substantially cone lateral surfaces are surfaces formed so as to expand with respect to the lateral surface of a cone. These surfaces will be referred to as substantially conical surfaces 34 and 36. These substantially conical surfaces 34 and 36 together form a V-shaped groove, in which the chain 16 is disposed such that side surfaces of the chain 16 are clamped between the substantially conical surfaces 34 and 36.

The arrangement of the fixed sheave and the movable sheave is reversed between the input pulley 12 and the output pulley 14. Specifically, in FIG. 1, the movable sheave 22 is located on the right side in the input pulley 12, whereas the movable sheave 32 is located on the left side in the output pulley 14. By sliding the movable sheave 22 or 32, the distance between the opposing substantially conical surfaces 24 and 26, or that between the opposing substantially conical surfaces 34 and 36 varies, which then varies a width of the V-shaped groove formed by these substantially conical surfaces. With the variation of the groove width, the chain wrapping radius also varies. More specifically, when the movable sheave 22, 32 moves away from the fixed sheave 20, 30, the groove width increases, so that the chain 16 moves to a deeper position in the groove to thereby decrease the wrapping radius. Conversely, when the movable sheave 22, 32 comes toward the fixed sheave 20, 30, the groove width decreases, so that the chain 16 moves to a shallow depth position in the groove to thereby increase the wrapping radius. As the variation of the wrapping radius is reversed between the input pulley 12 and the output pulley 14, the chain 16 is prevented from being loosened. With the sliding of the movable sheave 22, 32, the width of the V-shaped groove varies continuously, which results in continuous variation of the wrapping radius. As such, the transmission ratio during transmission from the input shaft 18 to the output shaft 28 can be varied continuously.

Figure 2:
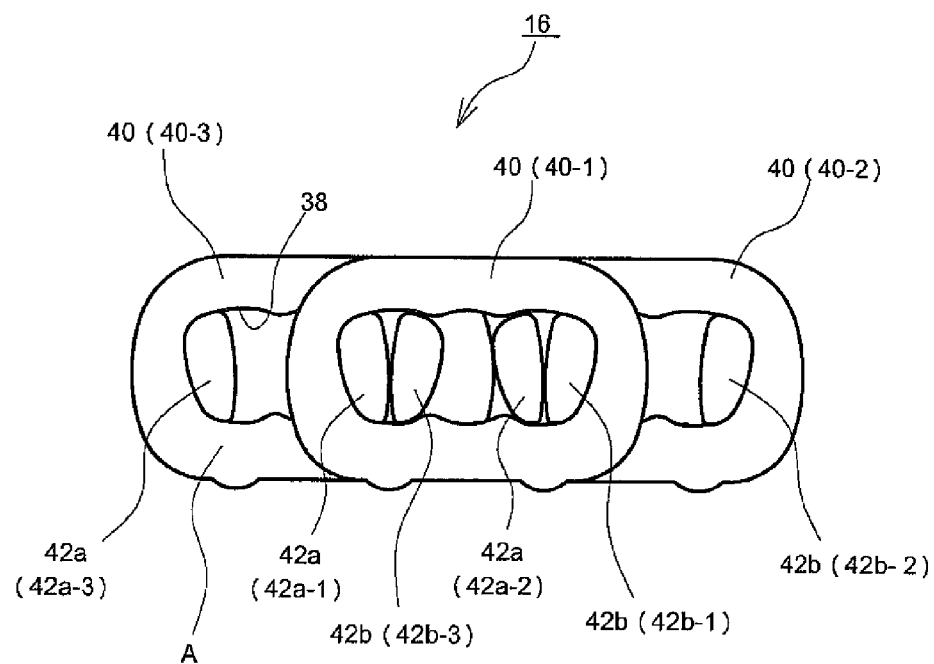
FIG. 2 is a side view illustrating the structure of a chain.
Figure 3:
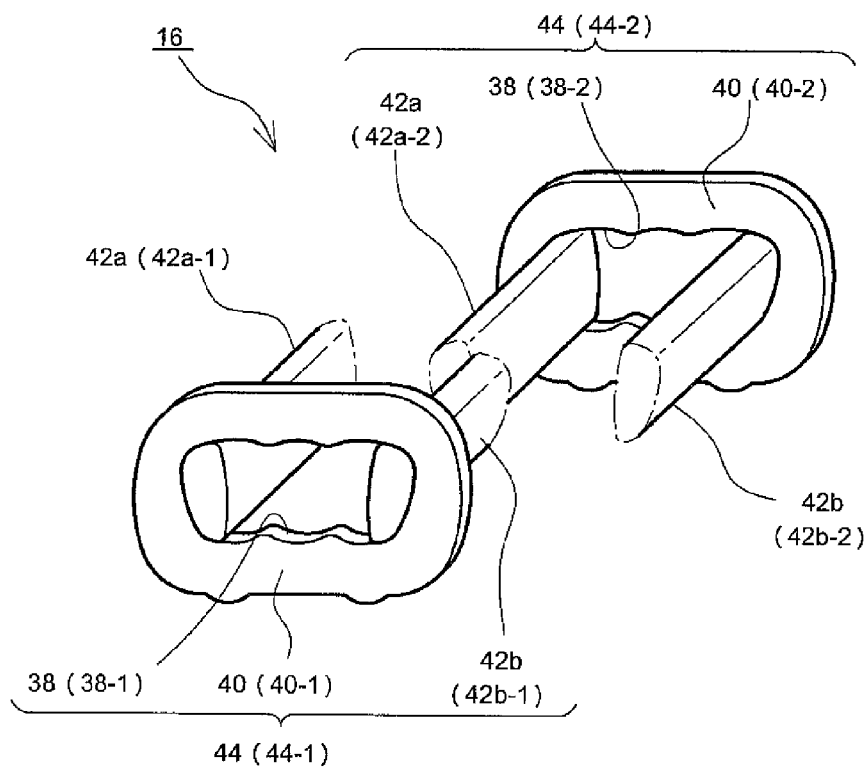
FIG. 3 is a perspective view for explaining the structure of a chain.
Figure 4:
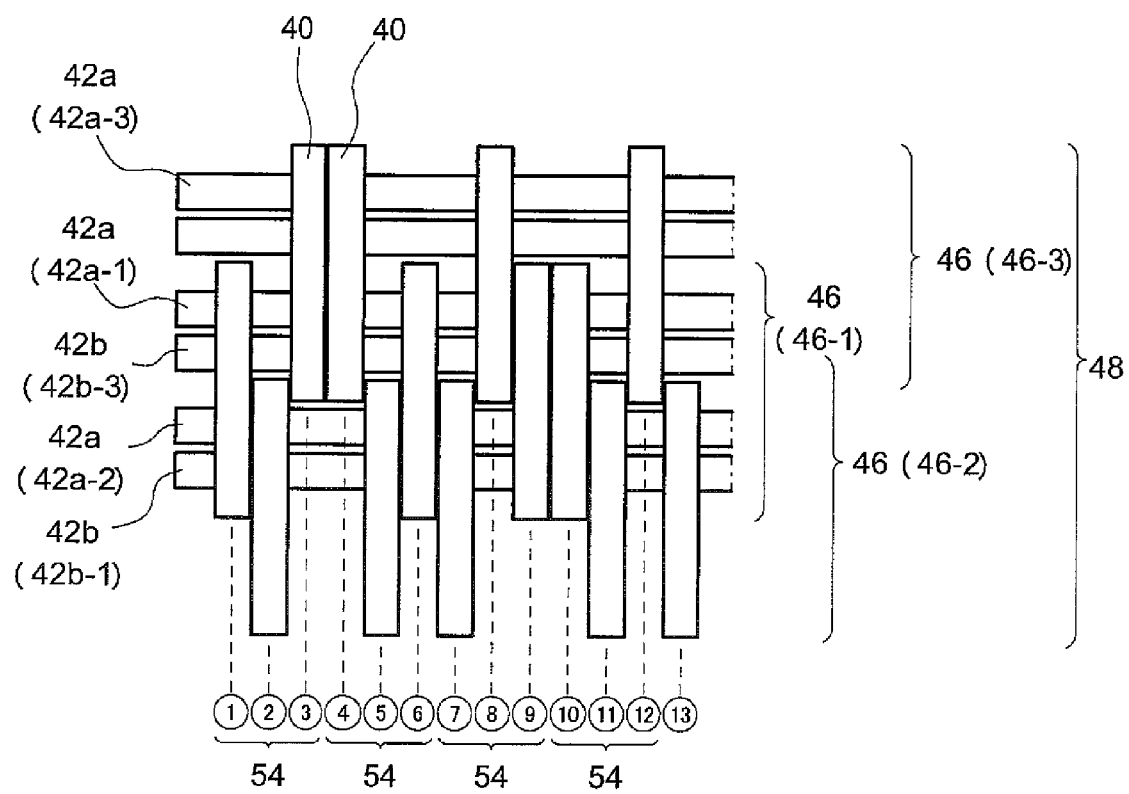
FIG. 4 is a plan view illustrating the structure of a chain.

FIGS. 2 to 4 illustrate details of the chain 16. In the following description, the direction along the extending direction of the chain 16 will be referred to as a circumferential direction, and the direction which is orthogonal to the circumferential direction and is parallel to the input shaft 18 and the output shaft 28 will be referred to a width direction, and the direction which is orthogonal to the circumferential direction and the width direction will be referred to as a thickness direction. FIG. 2 is a view illustrating a portion of the chain 16 seen from the width direction; FIG. 3 is a view illustrating a part of the chain 16 which is extracted and decomposed; and FIG. 4 is a view illustrating a portion of the chain 16 seen from the outer peripheral side in the thickness direction.

In FIG. 2, the left-right direction corresponds to the circumferential direction, and the top-down direction corresponds to the thickness direction. The chain 16 is formed of a combination of plate-shape links 40 each having an opening 38 and rod-shape pins 42a and 42b. The individual links 40 have the same shape, including the same thickness, and the rod-shape pins 42a have the same shape and the rod-shape pins 42b have the same shape. The links 40 are arranged in a predetermined pattern (see FIG. 4) in the width direction, and two pins 42a and 42b extend through the opening of each link at respective ends of the link. Both ends of the two pins 42a and 42b, or both ends of either one pin, come into contact with the conical surfaces 24 and 26, 34 and 36 of the input and output pulleys 12 and 14. A set of these two pins 42a and 42b and the links through which these two pins 42a and 42b extend will be referred to as a chain element 44. FIG. 3 illustrates two chain elements 44-1 and 44-2. Here, the suffix "-1", "-2", "-3" . . . is used to discriminate a chain element, and links and pins included in the chain element, from those of other chain elements. The chain element 44-1 is composed of a plurality of links 40-1 and the two pins 42a-1 and 42b-1 extending through the links 40-1. The two pins 42a-1 and 42b-1 are press fitted into or fixed and bonded to the opening 38-1 at the respective ends of the link 40-1. Similarly, the chain element 44-2 is composed of a plurality of links 40-2 and the two pins 42a-2 and 42b-2 extending therethrough. Further, the whole links 40 included in one chain element will be referred to as a link unit 46. The suffix "-1", "-2", "-3" . . . described above is also used for the link unit 46 when it is necessary to discriminate the chain elements included in the link unit 46.

The chain elements 44-1 and 44-2 which are adjacent to each other can be interconnected by allowing the pin 42 of one chain element to pass through the opening 38 in the other chain element and vice versa. As illustrated in FIG. 3, the pin 42b-1 of the chain element 44-1 on the left side of the drawing is placed within the opening 38-2 so as to be positioned on the right side of the pin 42a-2 of the chain element 44-2 on the right side. Conversely, the pin 42a-2 of the chain element 44-2 on the right side is placed within the opening 38-1 so as to be positioned on the left side of the pin 42b-1 of the chain element 44-1 on the left side. These two pins 42b-1 and 42a-2 engage together to transmit a tension of the chain 16. For bending the chain 16, the adjacent pins; e.g., pins 42b-1 and 42a-2, move in such a manner that they roll on mutual contact surfaces, so that bending can be allowed.

The arrangement pattern of the links 40 within the link unit 46 is the same every three link units in the circumferential direction. Here, a set of three chain elements 44 having different link arrangement patterns will be referred to as an element module 48. Thus, the chain 16 can be regarded as an arrangement of the element modules 48 having the same link arrangement pattern in the circumferential direction. In this embodiment, one element module 48 includes twenty-five links 40, and the numbers of links of the three link units 46 included in the one element module 48 are 9, 8, and 8, respectively.

FIG. 4 is a view illustrating one example arrangement pattern of the links 40, and illustrates half the width of the chain 16, with the other half having a symmetrical pattern. Each link 40 belongs to one row, which will be referred to as the first row, the second row, and so on, from the left side of the drawing. (In FIG. 4, the row number is indicated as an encircled number.) As the thickness of the link 40 is uniform, the rows are arranged at an equal pitch. In the example illustrated in FIG. 4, the link 40 in the first row is included in a first link unit 46-1, the link 40 in the second row is included in a second link unit 46-2, and the link 40 in the third row is included in a third link unit 46-3.

As it is not possible to adopt the same arrangement pattern for each link unit 46 due to interference of the links, the bending amount of the pins 42a and 42b differs from pin to pin, which makes the stress generated in each link also differ. Meanwhile, when the pins 42a and 42b are pinched between the pulleys 12 and 14, a friction force in the circumferential direction is generated between the end surface of the pin and the conical surface 24, 26, 34, 36, causing the pins 42a and 42b to bend. Accordingly, the stress generated in the link 40 is increased or decreased with a period of one rotation of the chain 16. The quantity of this increases and decreases; that is, an amplitude, of the stress affects the durability of the chain 16. As described above, because the stress related to each link varies by changing the arrangement pattern of the links, this feature can be utilized to reduce the amplitude of stress generated in the link.

Figure 5:
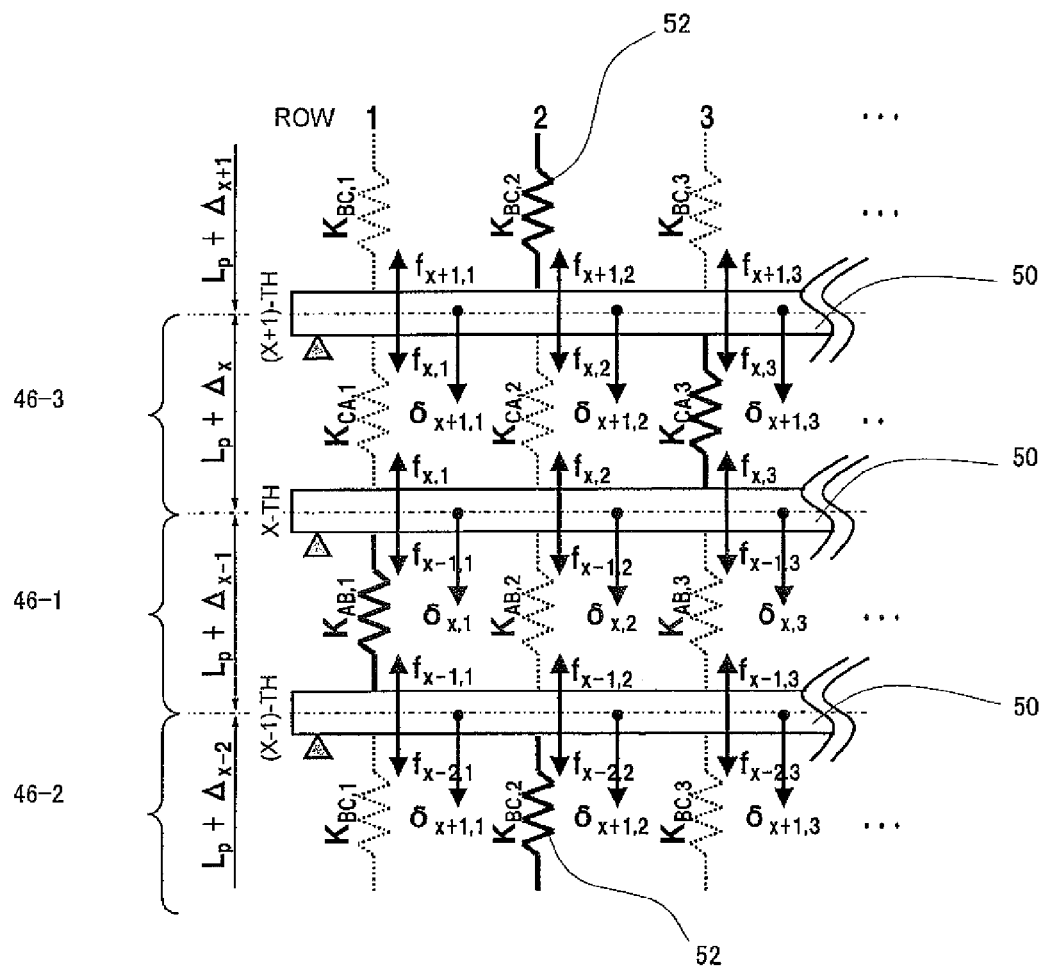
FIG. 5 is a view illustrating a calculation model for computing a stress and deformation related to each part of a chain.

FIG. 5 illustrates a stress distribution calculation model. Two adjacent pins (e.g. 42a-2, 42b-1) are approximated by a single beam 50, and the link 40 is approximated by a spring 52. The location of the spring indicated by a solid line in FIG. 5 corresponds to a location where the link 40 is actually disposed. The beams 50 are arranged at a pitch Lp, the value of which increases and decreases by Δ due to a tension or the like. Further, a force acting between the beam 50 and the spring 52 is indicated as f, and bending of the beam 50 caused by this force f is indicated as δ.

As a result of calculation based on the model described above, it was proved that, in the case in which the numbers of links in the link unit are 9, 8, and 8, the stress amplitude is not always reduced by the link arrangement proposed in Patent Document 1 described above. The link arrangement proposed in Patent Document 1 is the same as that of the present embodiment in that three chain elements form a singe element module, whereas the link arrangement of Patent Document 1 differs from that of the present embodiment in the arrangement pattern of individual links as described below. Specifically, in Patent Document 1, the links in the two outermost rows of the chain are included in the same link unit, the links in the following two rows are included in the same link unit which differs from the link unit in which the outermost links are included, and, on the further inner side, the links in three or more rows are disposed in the same link unit other than the above-described two link units.

The link arrangement according to the present embodiment will be described below. As described above, in the present embodiment, one element module 48 includes twenty-five links 40, and the three link units include nine links 40, eight links 40, and eight links 40, respectively. Further, in one element module 48, a width-direction unit 54 is defined for every three rows from the right and left ends. More specifically, the links 40 in the first to third rows define one width-direction unit, the links 40 in the fourth to sixth rows define another width-direction unit, and so on. The link in the thirteenth row at the center is not included in any width-direction unit. The three links that belong to one width-direction unit 54 are included in different link units 46. For example, referring to FIG. 4, in the width-direction unit 54 at the left end, the link 40 in the first row is included in the first link unit 46-1, the link 40 in the second row is included in the second link unit 46-2, and the link 40 in the third row is included in the third link unit 46-3. This is because it is intended that the links as a whole are arranged substantially evenly in the width direction within the link unit.

FIG. 6 shows specific link arrangement patterns, and indicates the row (link position) of the link and the corresponding link unit 46. With regard to the numbers in the cells of the table, "1" indicates the first link unit 46-1, "2" indicates the second link unit 46-2, and "3" indicates the third link unit 46-3. A blank cell indicates that the link 40 in that row can be included in an arbitrary link unit so long as the condition that three links in one width-direction unit 54 are included in respectively different link units is satisfied. Here, the position at which the stress amplitude of the link 40 is maximum is near the end portion of a range where the pin is in contact with the link (the location where the stress is converged), as indicated by "A" in FIG. 2. Each arrangement pattern of the links will be evaluated with reference to the stress in this portion.

In the first pattern, the links in the first row and the sixth row are included in the same link unit, the links in the second row and the fifth row are included in the same link unit, and the links in the ninth row and the tenth row are included in a link unit other than the link unit in which the links in the second and the fifth rows are included.

For example, if the links in the first row and the sixth row are included in the first link unit, the links in the second row and the fifth row are supposed to be included in the second or third link unit that are units other than the first link unit. The cases in which the links in the second row and the fifth row are included in the second link unit are indicated in the upper two levels and the cases in which the links in the second row and the fifth row are included in the third link unit are indicated in the lower two levels in the first pattern. The link unit corresponding to the third row is automatically determined by determining the link units corresponding to the first and second rows, and corresponds to the third link unit in the upper two levels of pattern 1 and the second link unit in the lower two levels of the same. Further, the links 40 in the ninth row and the tenth row are included in the same link unit which is different from the link unit corresponding to the second and fifth rows. Therefore, in the case of the upper two levels, the links in the ninth row and the tenth row are included in the first link unit (see the first level in FIG. 6) or the third link unit (see the second level in FIG. 6) other than the second link unit in which the links in the second and fifth rows are included. If the links in the second and fifth rows are included in the third link unit (the lower two levels of pattern 1 in FIG. 6), the links in the ninth row and the tenth row are included in the first link unit (see the third level in FIG. 6) or the second link unit (see the fourth level in FIG. 6).

Figure 7:
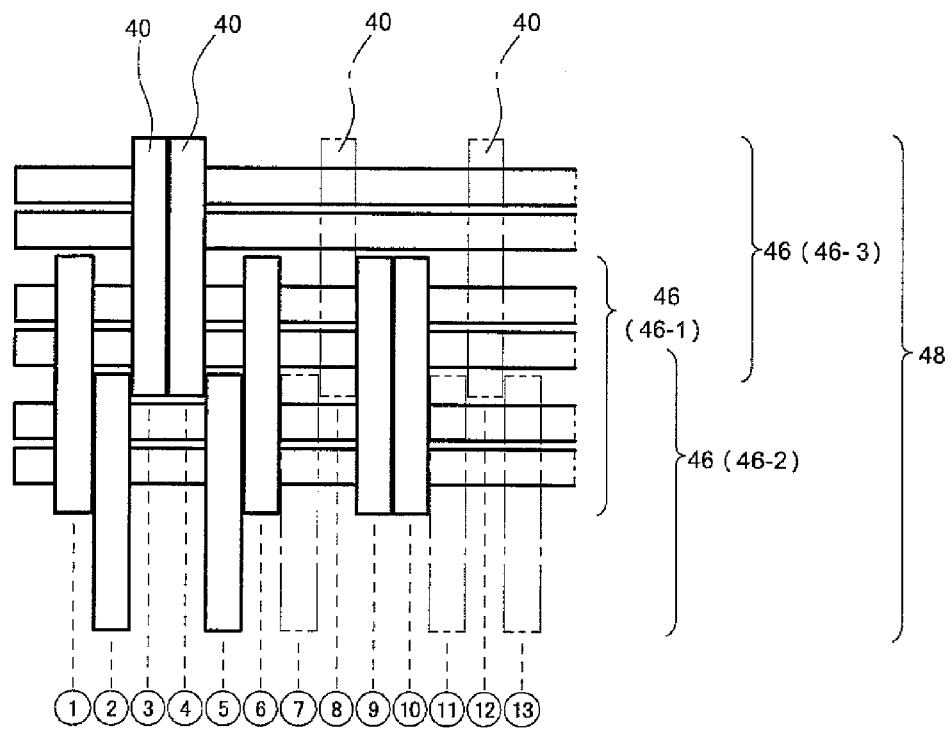
FIG. 7 is a view illustrating one specific example arrangement pattern of links according to the present embodiment.
Figure 8:
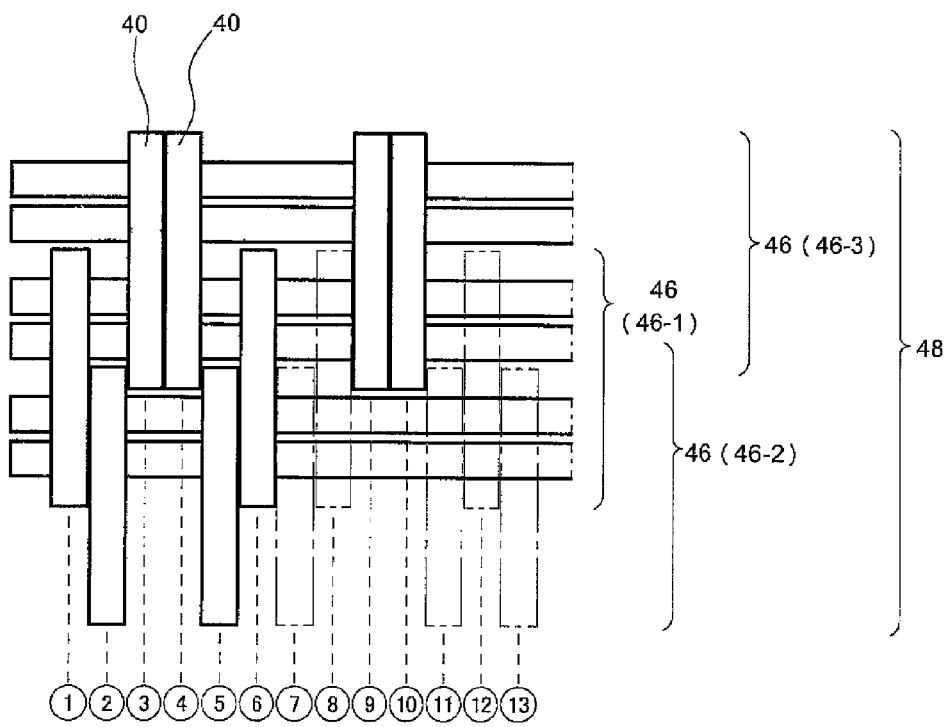
FIG. 8 is a view illustrating another specific example arrangement pattern of links according to the present embodiment.
Figure 9:
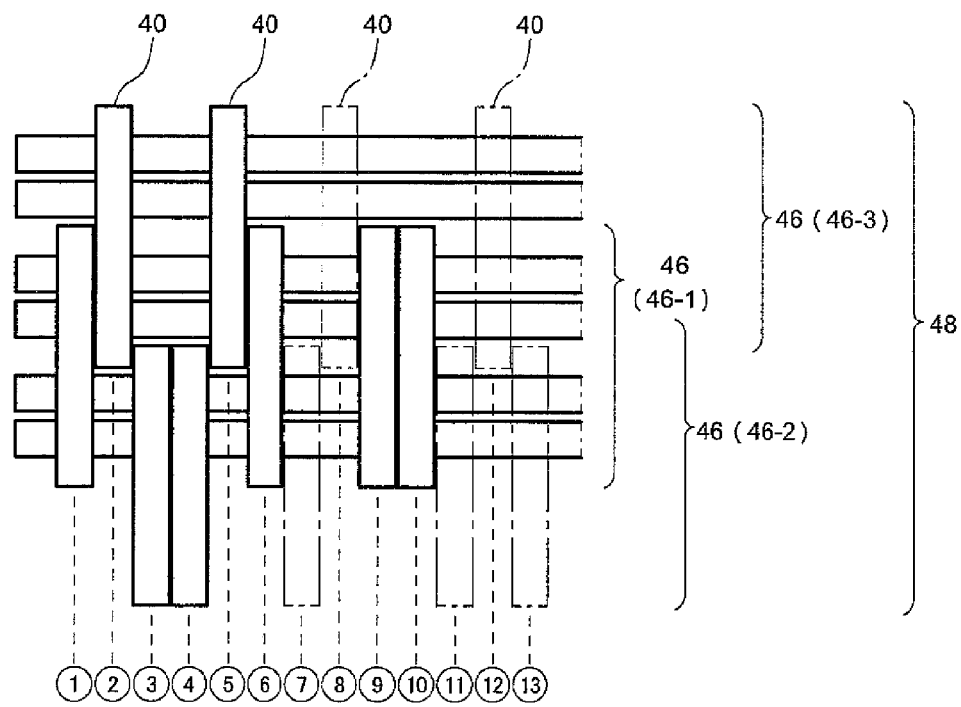
FIG. 9 is a view illustrating a further specific example arrangement pattern of links according to the present embodiment.
Figure 10:
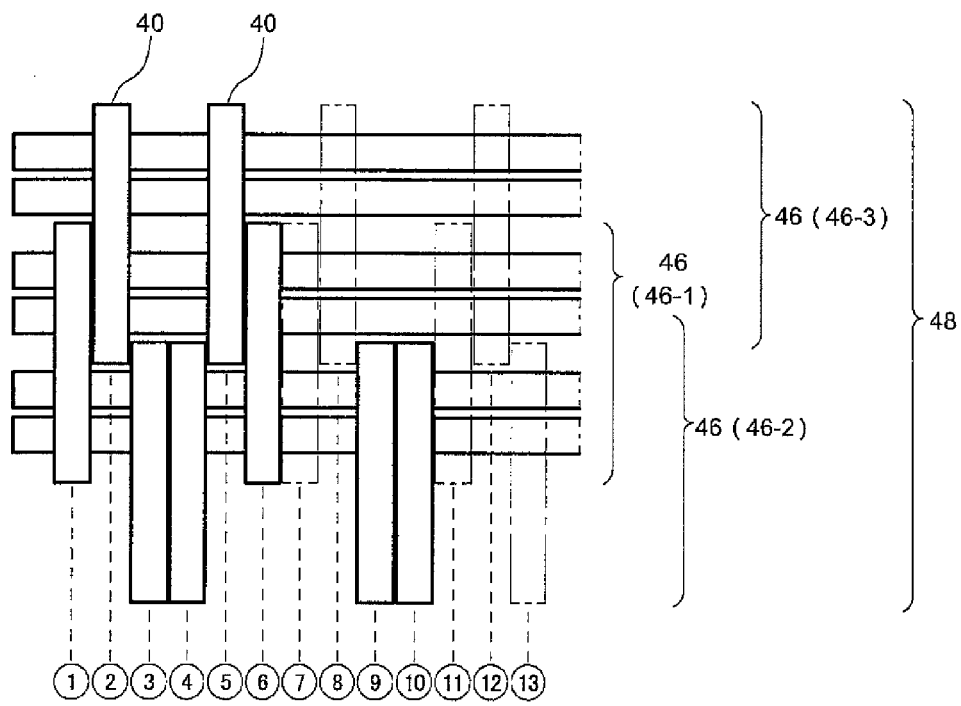
FIG. 10 is a view illustrating still another specific example arrangement pattern of links according to the present embodiment.

The arrangements in the first pattern described above are illustrated in FIGS. 7 to 10. FIG. 7 corresponds to the first pattern at the first level in FIG. 6; FIG. 8 corresponds to the first pattern at the second level in FIG. 6; FIG. 9 corresponds to the third level; and FIG. 10 corresponds to the fourth level. In each drawing, the link indicated by alternate long and short dashed lines can be placed at a desired position so long as the condition that the three links in one width-direction unit are included in different link units is satisfied.

In the second pattern, the links in the first row and the sixth row are included in the same link unit; the links in the second row, the fifth row, the ninth row, and the tenth row are included in the same link unit; and the link in the thirteenth row is included in a link unit other than the link unit in which the links in the second row, the fifth row, the ninth row, and the tenth row are included. In the description of the second pattern and the subsequent patterns, the procedure of arrangement of the links and drawings specifically illustrating the link arrangement patterns will be omitted. These can be easily understood with reference to the description and the drawings related to the first pattern.

In the third pattern, the links in the first row and the sixth row are included in the same link unit; the links in the second row and the fifth row are included in the same link unit; the link in the ninth row is included in a link unit other than the link unit in which the links in the second and the fifth rows are included; and the links in the tenth row and the thirteenth row are included in the same link unit other than the link unit in which the link in the ninth row is included.

In the fourth pattern, the links in the first row and the sixth row are included in the same link unit; the links in the second row and the fifth row are included in the same link unit; the link in the ninth row is included in a link unit other than the link unit in which the links in the second and the fifth rows are included; the links in the ninth row, the tenth row, and the thirteenth row are included in different link units; and the links in the seventh row and the thirteenth row are included in the same link unit. The link unit corresponding to the eighth row is automatically determined by determining the link units corresponding to the seventh and ninth rows.

In the fifth pattern, the links in the first row and the sixth row are included in the same link unit; the links in the second row, the fourth row, and the thirteenth row are included in the same link unit; and the links in the third row, the fifth row, the seventh row, and the tenth row are included in the same link unit.

In the sixth pattern, the links in the first row, the fifth row, and the ninth row are included in the same link unit; the links in the second row, the sixth row, the seventh row, and the tenth row are included in the same link unit; and the links in the third row, the fourth row, and the thirteenth row are included in the same link unit. The link unit corresponding to the eighth row is automatically determined by determining the link units corresponding to the seventh and ninth rows.

Figure 11:
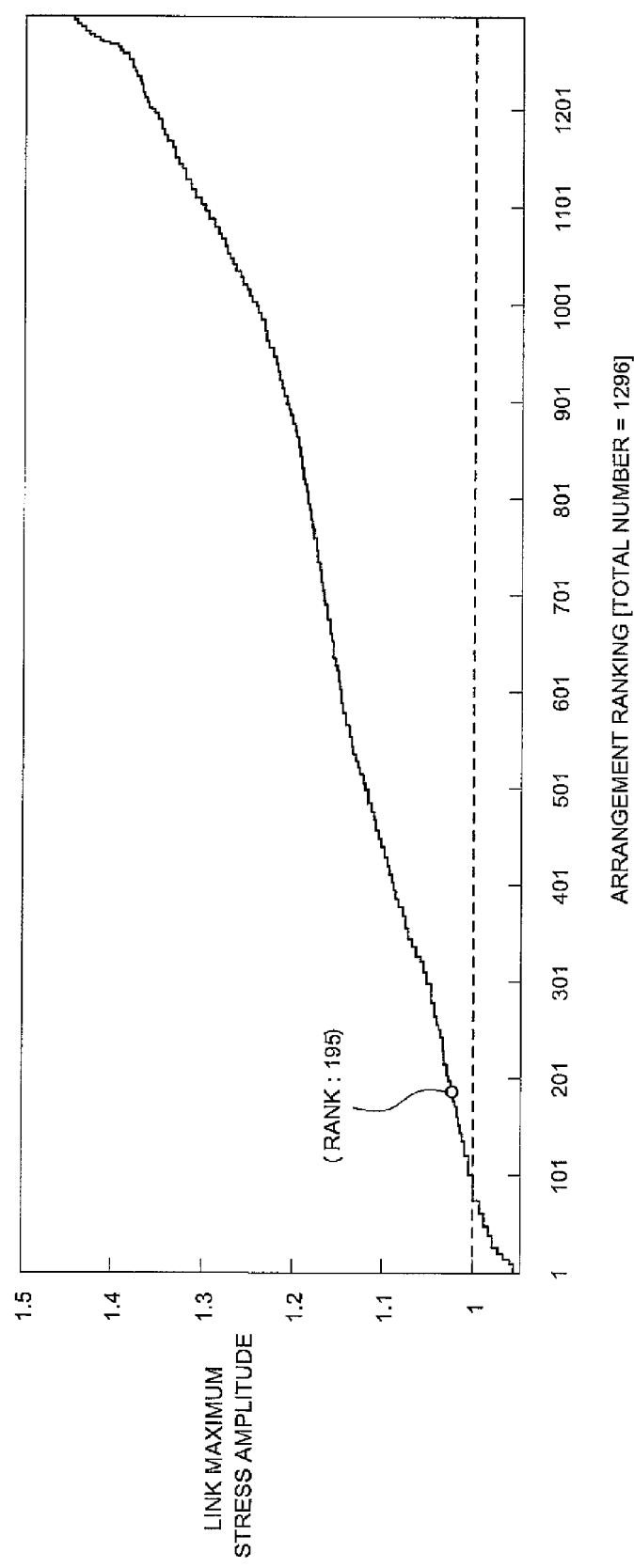
FIG. 11 is a view illustrating a relationship between the arrangement patterns and the maximum stress amplitude.

FIG. 11 illustrates a relationship between the link arrangement pattern and the maximum stress amplitude of the link. The arrangement patterns indicated along the horizontal axis include all the arrangement patterns that satisfy the condition that three links in one width-direction unit 54 are included in different link units 46. Along the horizontal axis, these arrangement patterns are arranged in ascending order of maximum stress amplitude. Here, the maximum stress amplitude of the link is represented by a ratio with respect to the smallest value concerning the arrangement patterns of Patent Document 1.

Among the six arrangement patterns described above; that is, the first pattern to the sixth pattern, the arrangement pattern for which the maximum stress value is the greatest ranks number 195 in ascending order of the stress amplitude. As the total number of the arrangement patterns is 1296, it can be understood that the above-described arrangement pattern is rated as being in the top 15%.

FIGS. 12 to 15 indicate all the patterns corresponding to the sixth arrangement patterns described above in ascending order of the maximum stress amplitude of the link. Here, concerning top six arrangement patterns, the maximum stress amplitude of the link in the third row is recorded in the first and second arrangement patterns, and the maximum stress amplitude of the link in the first row is recorded in the third to sixth arrangement patterns.

As a result of calculation based on the model illustrated in FIG. 5, it was further proved that, in the case in which the numbers of links in the link unit within one element module are 8, 8, and 8, the stress amplitude is similarly not always reduced by the link arrangement proposed in Patent Document 1 described above.

The link arrangements according to another embodiment will be described below. In this embodiment, one element module 48 includes twenty-four links 40, and the numbers of links in three link units are 8, 8, and 8, respectively. Further, in one element module 48, a width-direction unit 54 is defined for every three rows from the right end and the left end. Specifically, the links 40 in the first to third rows define one width-direction unit 54, the links 40 in the fourth to sixth rows define another width-direction unit 54, and so on. The three links within one width-direction unit 54 are included in different link units 46.

FIG. 16 indicates specific link arrangement patterns, and shows the row (link position) of the link and the corresponding link unit 46 in which the link is included. With regard to the numbers in the cells of the table, "1" indicates the first link unit 46-1, "2" indicates the second link unit 46-2, and "3" indicates the third link unit 46-3. A blank cell indicates that the link 40 in that row can be included in an arbitrary link unit so long as the condition that three links in one width-direction unit 54 are included in different link units is satisfied. Here, the position at which the stress amplitude of the link 40 is maximum is near the inner end portion of the chain in a range where the pin is in contact with the link (the location where the stress is converged), as indicated by "A" in FIG. 2. Each arrangement pattern of the links will be evaluated with reference to the stress in this portion.

In the seventh pattern, the links in the first row and the sixth row are included in the same link unit, the links in the second row and the fifth row are included in the same link unit, and the links in the ninth row and the tenth row are included in the same link unit other than the link unit in which the links in the second and the fifth rows are included.

For example, if the links in the first row and the sixth row are included in the first link unit, the links in the second row and the fifth row are supposed to be included in the second or third link unit that are link units other than the first link unit. The cases in which the links in the second row and the fifth row are included in the second link unit are indicated in the upper two levels and the cases in which the links in the second row and the fifth row are included in the third link unit are indicated in the lower two levels in the seventh pattern. The link unit corresponding to the third row is automatically determined by determining the link units corresponding to the first and second rows, and corresponds to the third link unit in the upper two levels and the second link unit in the lower two levels. Further, the links 40 in the ninth row and the tenth row are included in the same link unit which is different from the link unit corresponding to the second and fifth rows. Therefore, in the case of the upper two levels, the links in the ninth row and the tenth row are included in the first link unit (see the first level in FIG. 16) or the third link unit (see the second level in FIG. 16) other than the second link unit in which the links in the second and fifth rows are included. If the links in the second and fifth rows are included in the third link unit (the lower two levels of the seventh pattern in FIG. 16), the links in the ninth row and the tenth row are included in the first link unit (see the third level of the seventh pattern in FIG. 16) or the second link unit (see the fourth level of the seventh pattern in FIG. 16).

Figure 17:
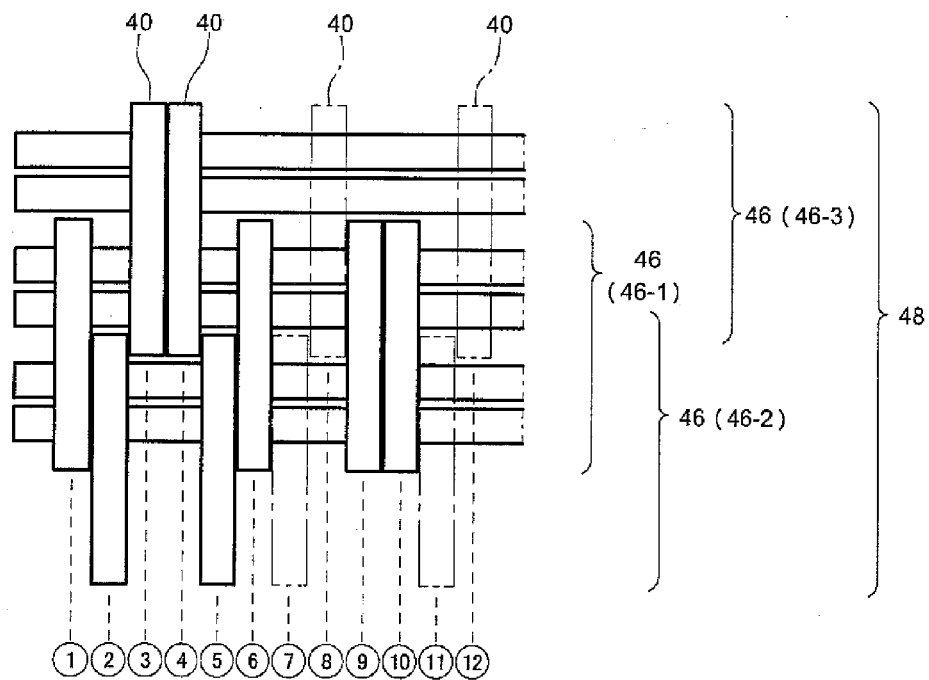
FIG. 17 is a view illustrating one specific example arrangement pattern of links according to the other embodiment.
Figure 18:
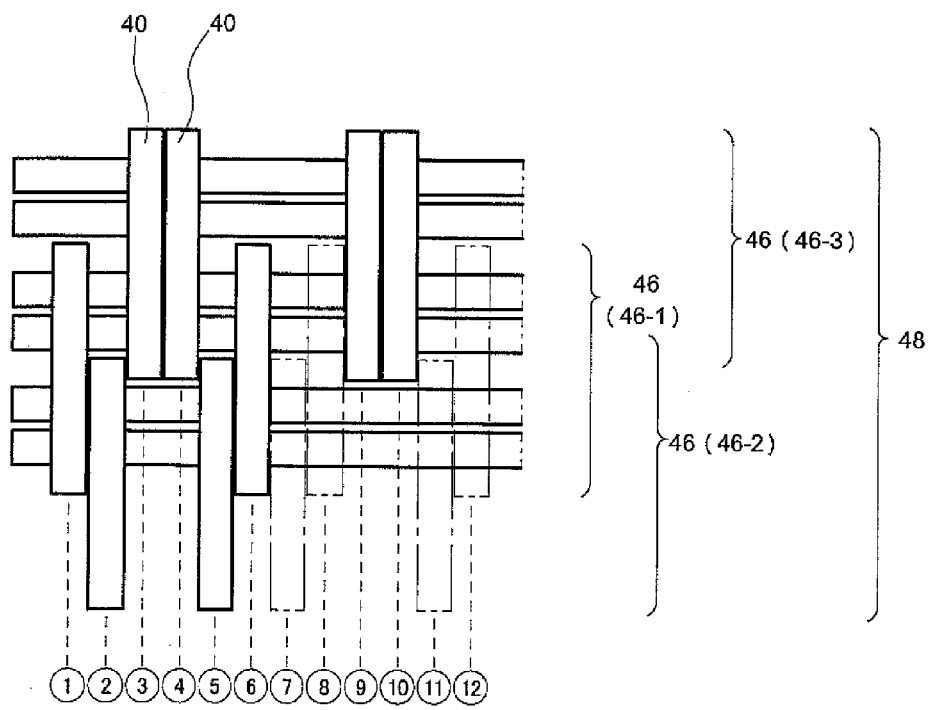
FIG. 18 is a view illustrating another specific example arrangement pattern of links according to the other embodiment.
Figure 19:
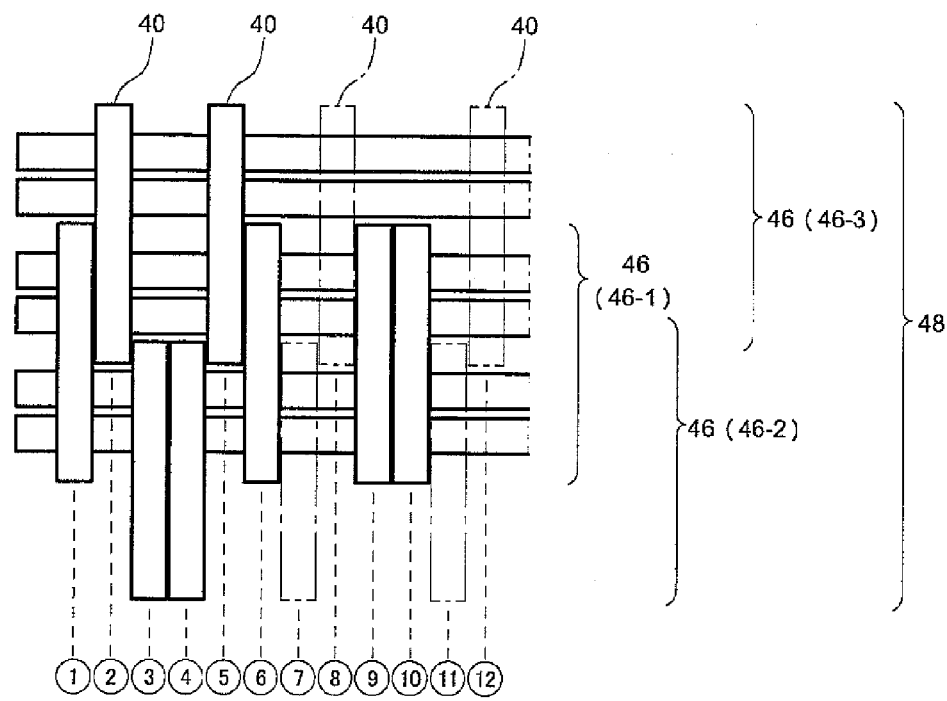
FIG. 19 is a view illustrating a further specific example arrangement pattern of links according to the other embodiment.
Figure 20:
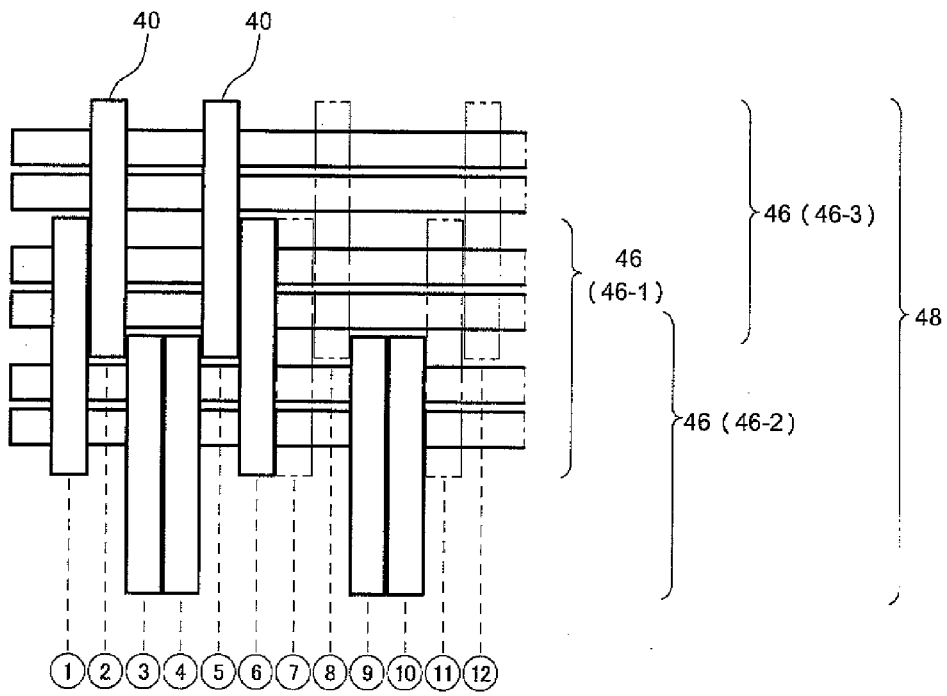
FIG. 20 is a view illustrating still another specific example arrangement pattern of links according to the other embodiment.

The arrangements in the seventh pattern described above are illustrated in FIGS. 17 to 20. FIG. 17 corresponds to the seventh pattern at the first level in FIG. 16; FIG. 18 corresponds to the seventh pattern at the second level in FIG. 16; FIG. 19 corresponds to the third level; and FIG. 20 corresponds to the fourth level. In each drawing, the link indicated by alternate long and short dashed lines can be placed at a desired position so long as the condition that the three links in one width-direction unit are included in different link units is satisfied.

In the eighth pattern, the links in the first row and the sixth row are included in the same link unit; the links in the second row and the fifth row are included in the same link unit; the links in the third row, the fourth row, and the ninth row are included in the same link unit; and the links in the ninth row, the tenth row, and the twelfth row are included in different link units. The procedure of arrangement of the links and specific arrangement patterns, which can be easily understood with reference to the description and the drawings related to the seventh pattern, will be omitted.

Figure 21:
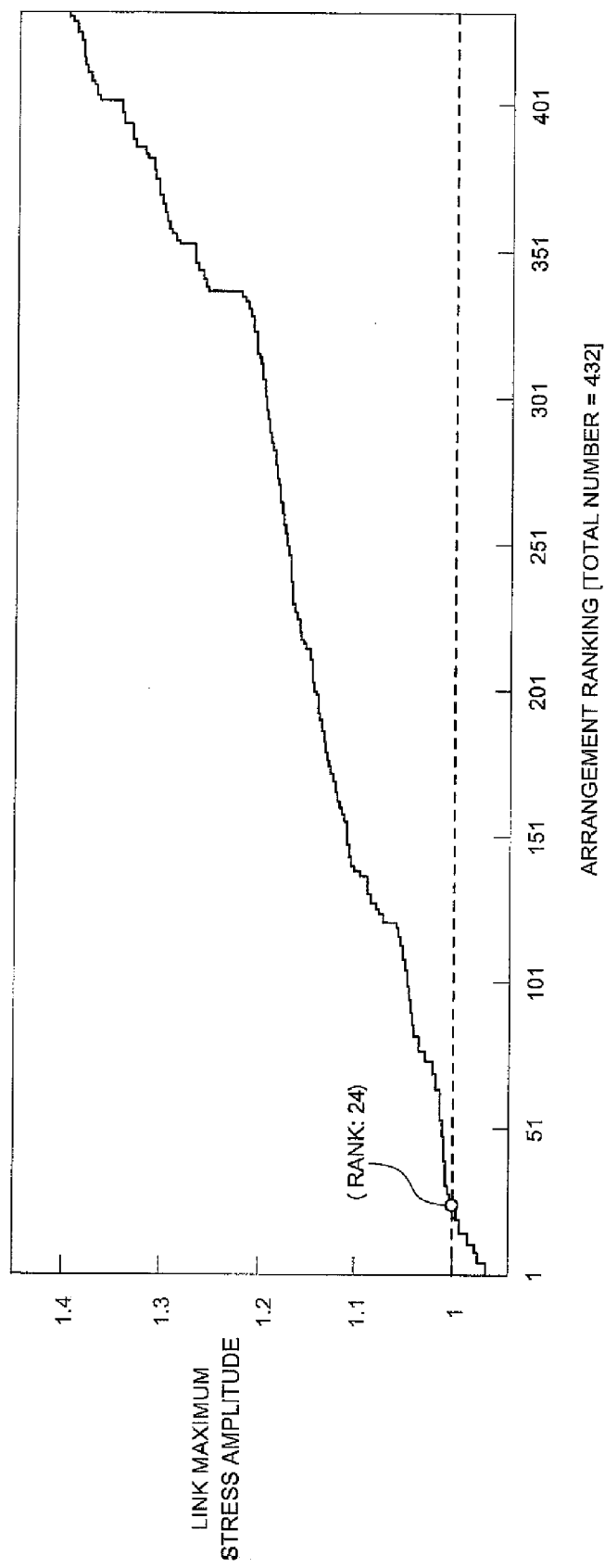
FIG. 21 is a view illustrating a relationship between the arrangement patterns and the maximum stress amplitude.

FIG. 21 illustrates a relationship between the link arrangement pattern and the maximum stress amplitude of the link. The arrangement patterns indicated along the horizontal axis include all the arrangement patterns that satisfy the condition that three links in one width-direction unit 54 are included in respectively different link units 46. Along the horizontal axis, these arrangement patterns are arranged in ascending order of maximum stress amplitude. Here, the maximum stress amplitude of the link is represented by a ratio with respect to the smallest value concerning the arrangement patterns of Patent Document 1.

Among the two arrangement patterns described above, the arrangement pattern for which the maximum stress value is the greatest ranks number 24 in the ascending order of stress amplitude. As the total number of the arrangement patterns is 432, it can be understood that the above-described arrangement pattern is rated as being in the top 5.6%.

FIG. 22 indicates all the patterns corresponding to the two arrangement patterns described above in ascending order of maximum stress amplitude of the link. Here, concerning the top six arrangement patterns, the maximum stress amplitude of the link in the third row is recorded in the first to fourth arrangement patterns, and the maximum stress amplitude of the link in the first row is recorded in the fifth and sixth arrangement patterns.

While the preferred embodiments of the present invention have been described using specific terms, such description is for illustrative purposes only, and it is to be understood that changes and variations may be made without departing from the spirit or scope of the appended claims.

What is claimed is:

1. A chain for a continuously variable transmission, the chain being wrapped around two pulleys each having opposing conical surfaces, a distance therebetween being variable, wherein the chain is formed by coupling chain elements, each chain element including a link unit in which a plurality of links each having an opening and placed to extend in a circumferential direction of the chain are arranged in a width direction of the chain and two pins which extend through the opening of the respective links at both ends of the link, both ends of at least one pin coming into contact with the conical surfaces, in which the chain elements are coupled such that the pin of one of two chain elements that are adjacent to each other in the circumferential direction of the chain passes through the opening of the link of the other chain element;

one element module is formed for every three consecutive chain elements, arrangement patterns in respective element modules being the same;

the numbers of the links in three link units included in each element module are 8 respectively;

in the element module, every three links from the right end and the left end of the chain form a width-direction unit, and the three links in one width-direction unit are included in respectively different link units; and the links in the first row and the sixth row from the right end and the left end of the chain are included in the same link unit; the links in the second row, the fifth row, and the seventh row are included in the same link unit; and the links in the ninth row and the tenth row are included in the same link unit other than the link unit in which the links in the second row and the fifth row are included.

* * * * *